(12) United States Patent     (10) Patent No.:    US 12,656,967 B2
Mendonsa et al.               (45) Date of Patent:         Jun. 16, 2026

(54) METHODS FOR REDUCING TIME TO RESUME DATA OPERATIONS IN SPUN DOWN HARD DRIVES

(71) Applicant: Seagate Technology LLC, Fremont, CA (US)

(72) Inventors: Riyan Alex Mendonsa, Edina, MN (US); Jon D. Trantham, Chanhassen, MN (US); Joshua Ward Christensen, Savage, MN (US); Jack Vincent Anderson, Jr., Shakopee, MN (US); Kenneth A. Haapala, Buffalo, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/897,161

(22) Filed: Sep. 26, 2024

(65) Prior Publication Data

US 2026/0086727 A1      Mar. 26, 2026

(51) Int. Cl.
*G06F 3/06*              (2006.01)

(52) U.S. Cl.
CPC .......... *G06F 3/0632* (2013.01); *G06F 3/0611* (2013.01); *G06F 3/0676* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; (Continued)

(56) References Cited

U.S. PATENT DOCUMENTS 9,202,511 B1 *  12/2015  Liu ...................... G11B 19/28
2006/0080501 A1 *  4/2006  Auerbach ............. G06F 1/3268
                                          711/112

(Continued)

OTHER PUBLICATIONS

E. Otoo, D. Rotem and S.-C. Tsao, "Workload-adaptive management of energy-smart disk storage systems," 2009 IEEE International Conference on Cluster Computing and Workshops, New Orleans, LA, USA, 2009, pp. 1-11, doi: 10.1109/CLUSTR.2009. 5289151. (Year: 2009).*

(Continued)

*Primary Examiner* — Daniel C. Chappell
(74) *Attorney, Agent, or Firm* — Mueting Raasch Group

(57)              ABSTRACT
Disclosed are systems and methods for reducing the amount of time required before resuming full data operations after a hard disk drive has been spun down and/or placed in a standby mode. Such systems and methods may make use of thresholds to changes in environmental parameters, such as temperature, that may affect hard disk drive calibrations. Environmental parameter changes below a threshold may allow a subset of calibrations to be skipped or otherwise reduced to resume data operations. In addition or alternatively, a hard disk drive may be placed in a read-only mode prior to performing all calibrations needed to resume full write operations.

13 Claims, 3 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56)                 References Cited

U.S. PATENT DOCUMENTS

| | | | |
|---|---|---|---|
| 2009/0177837 A1* | 7/2009 | Kaneda ................ | G06F 1/3203 |
| | | | 713/323 |
| 2011/0055431 A1* | 3/2011 | Fulkerson .......... | G06F 11/0727 |
| | | | 710/6 |
| 2011/0238887 A1* | 9/2011 | Bazzani ............... | G06F 3/0685 |
| | | | 711/E12.008 |

OTHER PUBLICATIONS

T. Bisson, S. A. Brandt and D. D. E. Long, "A Hybrid Disk-Aware Spin-Down Algorithm with I/O Subsystem Support," 2007 IEEE International Performance, Computing, and Communications Conference, New Orleans, LA, USA, 2007, pp. 236-245, doi: 10.1109/ PCCC.2007.358900. (Year: 2007).*

* cited by examiner

METHODS FOR REDUCING TIME TO RESUME DATA OPERATIONS IN SPUN DOWN HARD DRIVES

TECHNICAL FIELD

The disclosure relates to devices and methods for operating hard disk drives during power up.

SUMMARY

In accordance with various aspects, the present disclosure describes methods for use with a hard disk drive that utilizes calibrations during data operations, such methods including, while the hard disk drive is in a standby mode, monitoring one or more parameters of the hard disk drive environment, responsive to receiving a spin up command, comparing the one or more parameters to similar parameter information obtained when the calibrations were last updated, based on the comparing step, determining a subset of calibrations needed for resuming data operations, and resuming read and/or write data operations using calibration calculations that do not exceed the subset of calibrations.

In certain aspects, resuming read and/or write data operations comprises resuming only read data operations until full calibrations are complete. In certain aspects, resuming read and/or write data operations comprises resuming write data operations at a reduced performance until full calibrations are complete. In certain aspects, resuming read and/or write data operations comprises resuming write data operations by writing data to a temporary location until full calibrations are complete. For example, the temporary location is DRAM or flash memory.

In certain aspects, the calibrations include servo calibrations. In certain aspects, the calibrations include motor and/or actuator calibrations.

In certain aspects, comparing the one or more parameters comprises comparing a temperature change of the drive between when the calibrations were last updated and when receiving the spin up command. In certain aspects, comparing the temperature change comprises comparing the temperature change to a maximum temperature change for skipping selected calibrations. For example, the maximum temperature change is at least 10 degrees C. or is at least 5 degrees C. In certain aspects, the maximum temperature change is different for resuming read data operations than for resuming write data operations.

In accordance with various aspects, the present disclosure describes methods for use with a hard disk drive that utilizes calibrations during data operations, where such methods include, responsive to receiving a spin up command, spinning up the hard disk drive and thereafter temporarily operating the hard disk drive in a read-only mode, and completing any pending read commands associated with the spin up command prior to completing all calibrations necessary to resume full write data operations.

In certain aspects, the methods include resuming limited write data operations prior to completing all calibrations necessary to resume full write data operations. In certain aspects, resuming limited write data operations comprises completing a subset of the all calibrations necessary to resume full write data operations. In certain aspects, resuming limited write data operations comprises committing data writes to a temporary location. In certain aspects, resuming limited write data operations comprises performing data writes at a lower performance.

In certain aspects, the calibrations include servo calibrations, motor calibrations, or actuator calibrations.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
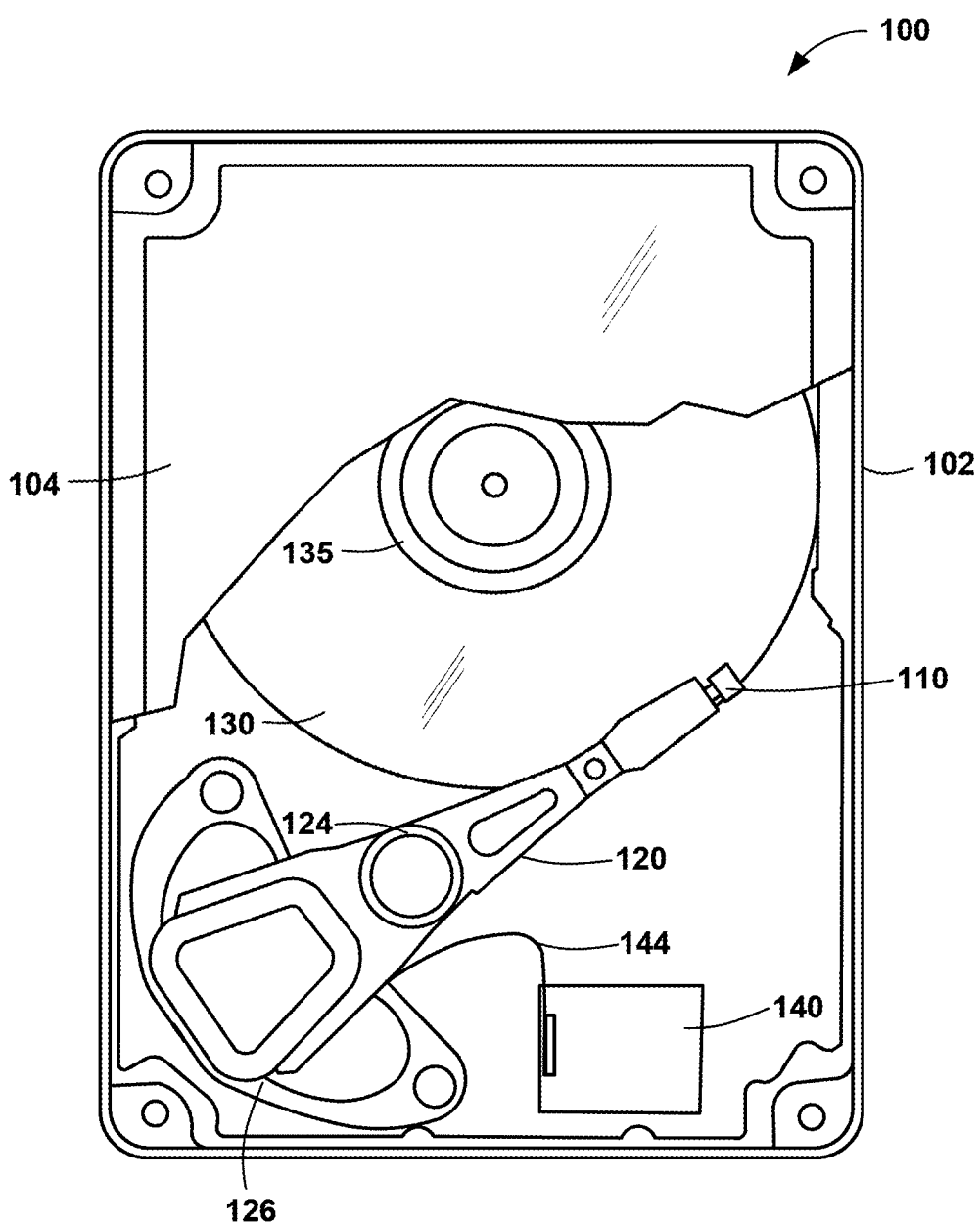
FIG. 1 is a schematic representation of an example hard disk drive as may be used in accordance with the present disclosure.

The present disclosure relates to reducing the amount of time required before data operations can resume after a hard disk drive (HDD) has been spun down and/or placed in a standby mode. The ability to implement reduced time to resuming data operations after spin down can allow for HDDs to be idled, thus saving power, while still retaining the ability to retrieve and store data within desired or specified time constraints.

Currently, power consumption in a data center is dominated by the usage of processors (GPUs) for AI training and inference, as well as for cooling the processors. The amount of energy these activities consume may in some cases exceed the available power at the data center, thereby limiting the amount of power available for other functions, including for data storage. Much of the power required for data storage may be consumed by operating HDDs. Thus, it may be beneficial to reduce HDD power consumption and/or to increase HDD power efficiency.

Because HDDs are often used to store less-frequently accessed data (or "cold" data), one way to increase HDD power efficiency is to "spin down" the HDDs that are not being used. This involves placing the HDD in a standby mode in which the motor that spins the magnetic media disks is shut down and the heads for reading and writing data are parked. While placing HDDs in a spun down or standby mode saves power, spinning idle HDDs back up to the point where data operations, that is data reads and data writes, can be performed may be a time-consuming task. Moreover, data centers often have limits on worst-case time delays for accessing requested data, which may be exceeded during the time required to spin up an idle HDD.

In various aspects of the present disclosure, it is recognized that a large portion of the time required to resume data operations has little or nothing to do with energizing the disk motor and spinning up the disks, but rather with disk drive calibrations. As such, aspects of the present disclosure relate to techniques for reducing calibration requirements, for determining whether calibration tables remain valid, for resuming certain data operation capabilities before full calibration requirements are met, and the like.

As an example, an HDD in standby mode may require up to 5 seconds for the spindle motor to spin up the disks to full RPM, with the remainder of the time being consumed in calibrations. The calibrations include servo calibrations, which primarily compensate for temperature effects that can lead to errors in head alignment and spindle harmonic runout due to mismatched thermal coefficients among the various components of the drive, such as the base deck, e-block, disks, clamp, top cover, and so forth. Servo calibration may also compensate for the temperature of the voice coil, magnets, and bearing grease, which can affect the coil resistance, magnetic flux, and bias hysteresis, respectively. Other calibrations include those related to controlling the gain of moving components such as motors and actuators, as well as compensating for differential expansion and contraction due to different coefficients of thermal expansion in the materials of different components. In addition to temperature, other environmental factors that can affect various calibrations include pressure, humidity, fluctuations in available power, and changes to the vibrational environment of the drive.

In various aspects of the present disclosure, it is recognized that if the conditions of the HDD that affect calibrations can be kept relatively stable, then calibration requirements may be reduced or in some instances skipped, thereby reducing the amount of time needed to resume data operations.

In certain aspects, determining whether and to what extent calibration requirements may be reduced or skipped involves monitoring environmental variables such as temperature, pressure, humidity, power, and/or mechanical mounting changes in or around the HDD. Comparing environmental parameters affecting the HDD at the time of spin up to similar parameters affecting the HDD at the time of the last calibration can be used to determine whether and what new calibrations are needed to resume data operations. Monitoring such environmental variables may be done using sensors included in or around the HDD, using sensors in or around other devices adjacent to the HDD, using information provided by the host device, or various combinations of these.

With respect to temperature, a change of 5 to 10 degrees C. or larger from the last calibration to when the spin up command is received could potentially trigger a write calibration event. As such, in some implementations each individual calibration, or a subset of those calibrations, may have a minimum temperature change threshold criterion (for example set between about 5 and 10 degrees C., inclusive) that could be used to determine whether the individual calibration, or subset of calibrations, can be skipped. In other implementations, a single temperature threshold criterion could be applied across all calibrations. Determining what temperature threshold to use may be done empirically by collecting drive performance and/or reliability metrics as a function of temperature changes over a range of normal operating temperatures and applying constraints on performance and/or reliability metrics. Alternatively, or in addition, a drive model obtained through various methods such as machine learning and/or kinematic equations may be used to determine how large of a temperature delta would result in calibration error(s) outside an acceptable range. Moreover, the calibration threshold(s) may be determined and set differently for resuming data read operations (for example, resuming in a read-only mode) versus resuming data write operations. As an example, a higher threshold (such as a 10 degrees C. temperature change) may be uses as the criteria for resuming read operations without calibration, whereas a lower threshold (such as a 5 degrees C. temperature change) may be required for resuming write operations without calibration.

Since write operations are generally more sensitive to calibrations than are read operations, it may be possible to resume data operations in a step wise fashion, first establishing the drive in a read-only mode and then subsequently performing the necessary calibrations to allow resuming of full write capabilities. For example, before the servo system is optimally calibrated, there may be low frequency seek settle position errors that would minimally affect the ability to read data even though they would result in only marginal write performance and higher bit error rates. As such, data read operations may be resumed prior to resuming data write operations. Moreover, in many circumstances, it may be anticipated that an HDD will receive a spin up command for the purpose of filling a data retrieval request and without any pending write requests that need servicing. In such cases, the drive can be quickly placed in a read-only mode while the pending read commands are completed, and thereafter taking the time needed to perform calibrations that enable full write capability.

In accordance with various aspects, the present disclosure includes the ability to service write commands prior to restoring full write capability, for example during a read-only mode. Any write commands received before calibration requirements are met may be executed by temporarily retaining the data in DRAM or writing the data to a different non-volatile storage device or medium such as on-board flash, external flash, another HDD, and so forth.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts a typical HDD device 100 that includes a recording head 110 having read and write capabilities. Recording head 110 is disposed on the end of an actuator arm 120 that is rotationally movable around a pivot 124 by use of a voice coil motor 126. The recording head 110 is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be coupled to spindle motor 135, and thereby control the spinning of the media disk(s) 130 along with the movement of the actuator 120 and the reading and writing of data via recording head 110. The internal components of HDD 100 are contained within an enclosure 102, including cover 104, which is shown partially cut away to reveal the internal components. A host device can communicate with HDD 100 through a standardized interface (not shown).

HDD 100 can operate on any magnetic recording principle, whether that be conventional magnetic recording (CMR), shingled magnetic recording (SMR), heat-assisted magnetic recording (HAMR), or any other type of recording technique, including combinations thereof. While the actuator 120 is shown to move rotationally, the present disclosure is not limited to how the actuator moves and encompasses linear actuation and multiple rotary actuators. Likewise, recording heads such as recording head 110 can be provided on movable or stationary rails, or in any other suitable manner now known or later contemplated.

Controller electronics 140 may be configured to calculate, store, retrieve, and apply servo calibration data, flash memory calibration information, defect tables, field adaptive fly height parameters (head to disk clearance compensation as a function of drive environmental values such as temperature and humidity), and other calibration data or information useful in facilitating the reliable storage and retrieval of data. While controller electronics 140 may be dedicated to the control of HDD 100, controller electronics may be shared among multiple disk drives or multiple spinning disk drive assemblies. HDD 100 may include one or more environmental sensors (not indicated), such as temperature or pressure sensors, that can be used to monitor the environmental conditions of the HDD 100. In accordance with certain aspects, monitoring the environmental conditions of an HDD while in standby mode and/or upon receiving a spin-up command may facilitate the ability to reduce the need for calibration or recalibration prior to resuming data operations during spin-up. Determining that certain calibrations may be reliably skipped can significantly reduce the amount of time required to resume HDD data operations.

Figure 2:
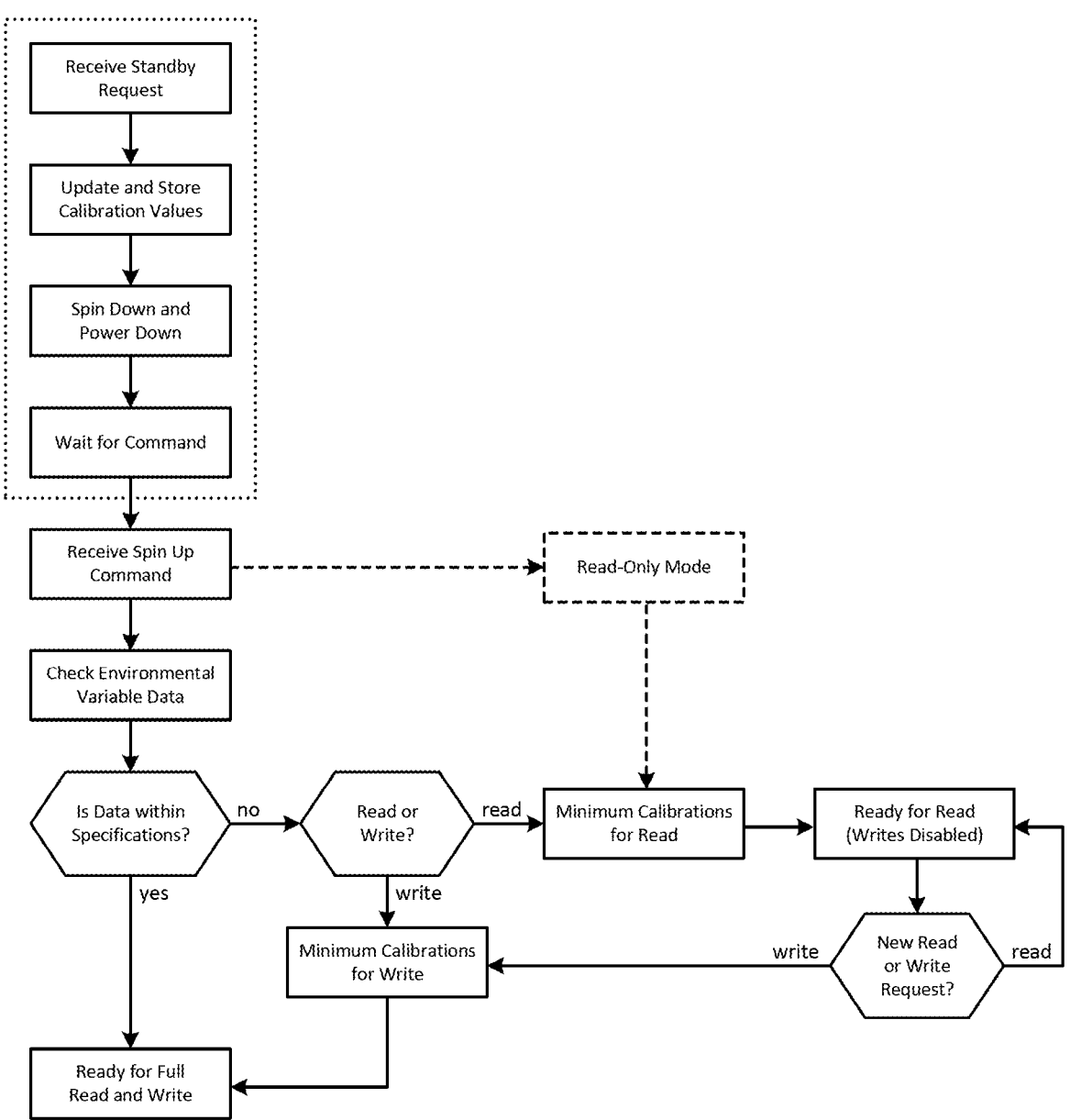
FIG. 2 is a flow chart depicting steps in exemplary methods in accordance with aspects of the present disclosure.

FIG. 2 depicts an exemplary workflow for used with a hard disk drive attached to a host device, in accordance with various aspects of the present disclosure. Upon receiving a standby request, for example to save power, the drive's calibrations are updated and stored so that the media disks can be spun down and the drive can be powered down into a desired power state. The drive may be completely powered off or placed in a standby mode. Subsequently, a power up or spin up command may be provided by the host, either to ready the drive for potential commands or to service commands such as read requests and/or write requests that are associated with the spin up command. Environmental parameters are then checked to determine whether and how much the parameters have changed (for example, relative to one or more threshold amounts) compared to when the calibration values were last stored. Environmental parameters may be derived from sensors included with the drive or may be derived from information provided by external sensors and/or directly from the host. Depending on whether and how much the parameters have changed, it is possible to resume data operations using a limited subset of calibration updates or by skipping one or more calibrations altogether. The minimum subset of calibrations needed to resume full or limited data operations may depend on whether data read operations are being resumed, data write operations are being resumed, or both. While data operations commence under the limited subset of calibrations, the remaining calibrations may be completed to prepare the drive for full read and write data operations.

Thresholds may be used to set the maximum amount of environmental change that a drive would have to experience since the last calibration in order to skip one or more calibrations. For example, threshold amounts of temperature change may be at least about 5 degrees C. or at least about 10 degrees C. The calibrations that may be performed or skipped based on such thresholds include servo AGC calibration (related to controlling head fly height), force constant calibration (related to coil/magnet gain of the voice coil motor), AC feed forward calibration (related to spindle harmonics), PZT calibration (related to gain of the piezo-electric actuator), head switch calibration (related to thermal shifts due to mismatch in coefficients of expansion), and other servo and/or mechanical calibrations. Moreover, while the environmental parameters of primary concert are typically temperature and humidity, the parameters used may depend on the type of HDD. For example, current helium filled drives that are sealed to prevent leaks exhibit very little humidity variations, and thus monitoring the humidity may not be a concern for such drives.

In certain drives, the 12 volt power supply voltage may be considered a significant environmental variable, which can vary +/−10% of nominal and thereby potentially affect the servo calibrations relating to VCM (voice coil motor) plant gain. Sampling of the cabinet or system supply voltage may be performed to adjust servo gain parameters for possible 12V supply changes to reduce the servo calibration time. For example, the drive firmware can sample via an ADC on the drive PCBA, or the system itself may provide the voltage parameter information. Another environmental parameter may be the cabinet mounting boundary conditions, which may affect the vibration feedforward calibration; however, changes to the mounting conditions may not be a consideration if the drive remains plugged into the same physical cabinet slot while in standby mode.

Upon determining whether environmental parameters are within specifications or threshold amounts, it may be determined whether read and/or write operations are to be resumed. Resuming limited write operations may involve temporarily storing the write command data to DRAM or to a different non-volatile medium, such as flash memory. Another alternative is to proceed with servicing the write commands but with reduced performance. Optionally, upon receiving a spin up command, the drive may be immediately placed in a read-only mode to thereby service read requests that are associated with the spin up command. In general, reads are less susceptible to servo calibration changes due to environmental effects, and so the checking of environmental parameters may be bypassed before entering a read-only mode. Upon entering a read-only mode, the workflow may proceed as otherwise described, or the drive may wait to complete full calibrations to further resume any other data operations (that is, other than servicing the read requests associated with the spin up command).

Command protocols for communicating between the drive and the host may be enhanced to facilitate notifying the host regarding the drive status. For example: for SATA interfaces, the Check Power Mode command protocol may be used; for SAS interfaces, the Test Unit Ready command protocol may be used; and for NVMe interfaces, a read to the Controller Status register may be issues (new bits may needed to be added). These commands may be enhanced to indicate to the host system whether the drive is ready for reading, writing, or both, as well as the level of performance expected until full data operations are restored.

It may be considered that the motor spin-up time coming out of standby mode may be dependent on the available total electrical power in the host system. For example, some host systems may do a staggered spin-up in which groups of drives are spun up in sequence to stay within a 12V power supply spin-up envelope. In such circumstances, the servo system motor spin-up current profile of the drive can be customized to use all the available power to thereby reduce the motor spin-up time, resulting in drawing more current than typical if more power is available. Moreover, energy storage devices such as capacitors or rechargeable batteries may be used to store energy that can be drawn to allow for faster spin-up on a current-limited USB supply. Capacitance may be added to the system design or HDD design to boost the spin-up current and allow a shorter spin-up time. Similar features can be used for moving out of standby for other similar data storage devices.

Figure 3:
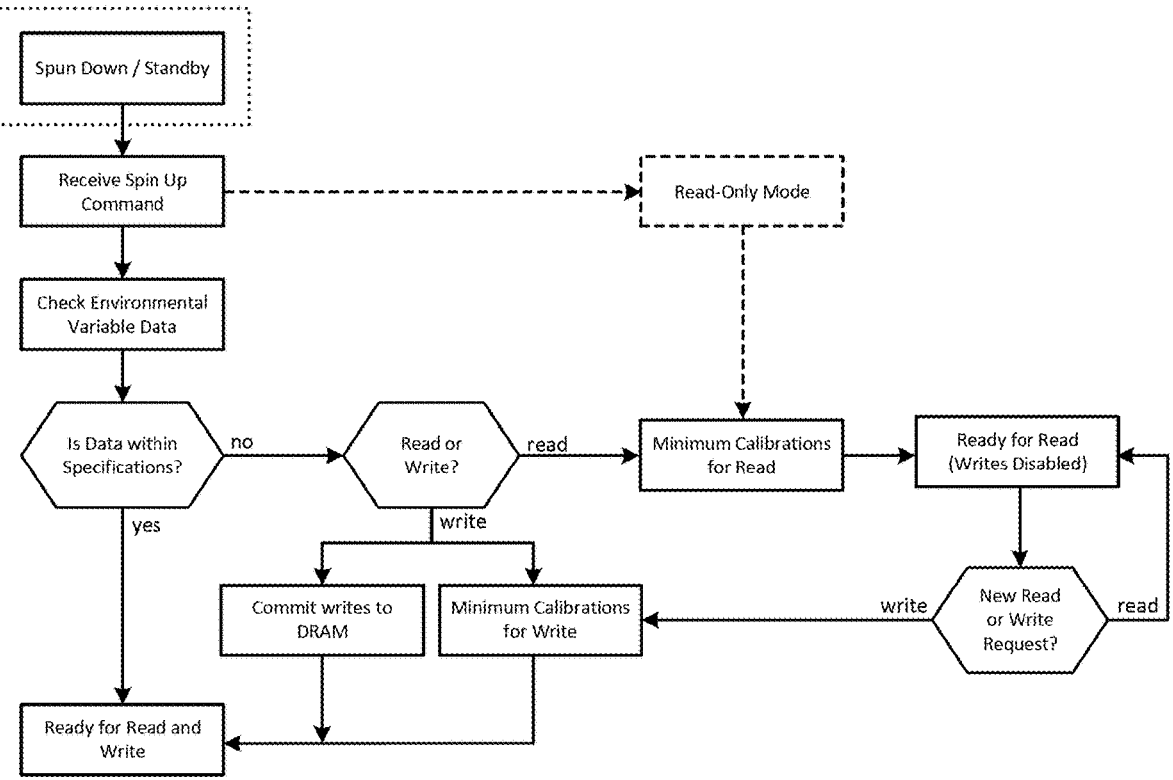
FIG. 3 is a flow chart depicting steps in exemplary methods in accordance with aspects of the present disclosure.

FIG. 3 is a flow chart that illustrates certain aspects of methods of the present invention. The steps show in FIG. 3 are similar to those shown in FIG. 2, except that FIG. 3 further illustrates the ability to commit writes to DRAM in addition to or instead of performing limited write operations under a minimum set of calibrations while waiting for full data operation readiness. As mentioned, DRAM (optionally backed by nonvolatile media such as flash) may be used to store write data while the required servo calibrations are being performed. In such circumstances, the write commands may be rate limited based so as to not overrun the amount of data that can be safely stored in the event of a power loss. Moreover, DRAM or flash writes may not be allowed until the drive is spun up so that there is sufficient energy to commit the writes to the nonvolatile media. In other words, the buffer size must be large enough to provision for the maximum data transfer size allowed during the motor spin up and calibration time following a power on from fully powered off state (for example, up to 30 seconds), as opposed to a shortened recovery time (such as 5 to 10 seconds) from the standby or partial power down state. Alternatively or in addition to committing writes to DRAM, writes may be committed directly to nonvolatile media, such as flash, during spin up. When writes are committed directly to nonvolatile media, the concerns noted above with respect to DRAM may be reduced or eliminated.

It will be recognized that the above descriptions are exemplary embodiments, and that various aspects described may be used optionally or conditionally in certain implementations or may be modified or replaced in certain implementations. For example, operations may be implemented on the magnetic media disk, in flash media or other non-volatile memory, or in a separate drive as part of a storage array. In certain implementations, a connected host may be made aware of the state of the drive so that, for example, commands may be paused or other commands may be leveraged to help facilitate or accommodate drive operations. In certain implementations, dynamic data tables may be used to track and handle the various data movements, and such tables may be stored on the magnetic disk or on another non-volatile medium such as flash. It will also be recognized that, since methods of the present disclosure may be implemented using existing or conventional HDD components and architectures, existing drives may be modified through a firmware update to be able to store data according to the various aspects described herein.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for use with a hard disk drive that utilizes calibrations during data operations of the hard disk drive, the method comprising:

while the hard disk drive is in a standby mode, monitoring one or more environmental parameters of the hard disk drive that may affect the calibrations;

responsive to receiving a spin up command for the hard disk drive, comparing the one or more environmental parameters to similar parameter information obtained when the calibrations were last updated;

based on the comparing, determining a subset of the calibrations needed for resuming data operations of the hard disk drive; and resuming data operations of the hard disk drive using only calibration calculations within the subset of the calibrations.

2. The method of claim 1, wherein resuming data operations comprises resuming only read data operations until all of the calibrations are complete.

3. The method of claim 1, wherein resuming data operations comprises resuming write data operations at a reduced performance until all of the calibrations are complete.

4. The method of claim 1, wherein resuming data operations comprises resuming write data operations by writing data to a temporary location until all of the calibrations are complete.

5. The method of claim 4, wherein the temporary location is DRAM.

6. The method of claim 4, wherein the temporary location is flash memory.

7. The method of claim 1, wherein the calibrations include servo calibrations.

8. The method of claim 1, wherein the calibrations include at least one of motor calibrations and actuator calibrations.

9. The method of claim 1, wherein comparing the one or more parameters comprises comparing a temperature change of the hard disk drive between a time when the calibrations were last updated and when receiving the spin up command for the hard disk drive.

10. The method of claim 9, wherein comparing the temperature change comprises comparing the temperature change to a maximum temperature change for skipping selected calibrations.

11. The method of claim 10, wherein the maximum temperature change is at least 10 degrees C.

12. The method of claim 10, wherein the maximum temperature change is at least 5 degrees C.

13. The method of claim 10, wherein the maximum temperature change is different for resuming read data operations than for resuming write data operations.

* * * * *